United States Patent
Yachi

(10) Patent No.: US 10,139,499 B2
(45) Date of Patent: Nov. 27, 2018

(54) RADIATION IMAGING APPARATUS AND METHOD OF CONTROLLING SAME

(71) Applicant: CANON KABUSHIKI KAISHA, Tokyo (JP)

(72) Inventor: Katsuya Yachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/596,154

(22) Filed: May 16, 2017

(65) Prior Publication Data

US 2017/0350994 A1 Dec. 7, 2017

(30) Foreign Application Priority Data

Jun. 3, 2016 (JP) ................................. 2016-112098

(51) Int. Cl.
| | | |
|---|---|---|
| *G01T 1/24* | (2006.01) | |
| *H04N 5/357* | (2011.01) | |
| *H04N 5/378* | (2011.01) | |
| *H04N 5/376* | (2011.01) | |

(52) U.S. Cl.
CPC ............ *G01T 1/247* (2013.01); *H04N 5/357* (2013.01); *H04N 5/378* (2013.01); *H04N 5/3765* (2013.01)

(58) Field of Classification Search
CPC ........ G01T 1/247; H04N 5/357; H04N 5/378; H04N 2201/04732; H04N 2201/04767
USPC .................................................. 250/370.08
See application file for complete search history.

(56) References Cited

U.S. PATENT DOCUMENTS

| | | | |
|---|---|---|---|
| 7,110,498 B2 | 9/2006 | Yamada | |
| 9,134,432 B2* | 9/2015 | Iwashita | ............... H04N 5/3575 |
| 9,270,907 B2* | 2/2016 | Naito | ..................... H04N 5/341 |
| 2003/0067533 A1* | 4/2003 | Omori | ...................... B41J 2/471 |
| | | | 347/248 |
| 2005/0058252 A1* | 3/2005 | Yamada | ................ G01T 1/2928 |
| | | | 378/114 |
| 2007/0064088 A1* | 3/2007 | Izumiya | .................. H04N 1/393 |
| | | | 347/261 |
| 2007/0242127 A1* | 10/2007 | Omori | ...................... B41J 2/471 |
| | | | 347/248 |

(Continued)

FOREIGN PATENT DOCUMENTS

| | | |
|---|---|---|
| JP | 4235516 | 3/2009 |
| JP | 2011-130362 | 6/2011 |

(Continued)

*Primary Examiner* — Taeho Jo
(74) *Attorney, Agent, or Firm* — Fitzpatrick Cella Harper and Scinto

(57) ABSTRACT

A radiation imaging apparatus has a sensor that converts irradiated radiation into a charge in accordance with a radiation dose, a switching power supply for supplying power to at least the sensor, and a readout unit that reads out a signal corresponding to the charge from the sensor. The radiation imaging apparatus synchronizes the imaging synchronization signal and a control clock for a switching operation of the switching power supply, causes a readout of signal from the sensor by the readout unit to be executed, and adjusts the phase of the control clock in each cycle of the imaging synchronization signal so that a timing of the imaging synchronization signal that occurs cyclically is at the same phase of the control clock.

19 Claims, 18 Drawing Sheets

(56) References Cited

U.S. PATENT DOCUMENTS

| | | | | |
|---|---|---|---|---|
| 2009/0251125 A1* | 10/2009 | Hawver | ................... | G01T 7/00 |
| | | | | 323/355 |
| 2013/0169784 A1* | 7/2013 | Iwashita | ................. | H04N 5/32 |
| | | | | 348/77 |
| 2014/0061491 A1* | 3/2014 | Iwashita | .............. | H04N 5/3575 |
| | | | | 250/393 |
| 2016/0302302 A1 | 10/2016 | Yachi | ................... | H05K 1/0216 |

FOREIGN PATENT DOCUMENTS

| | | | |
|---|---|---|---|
| JP | 2011130362 | * | 6/2011 |
| JP | 2014-028033 | | 2/2014 |

* cited by examiner

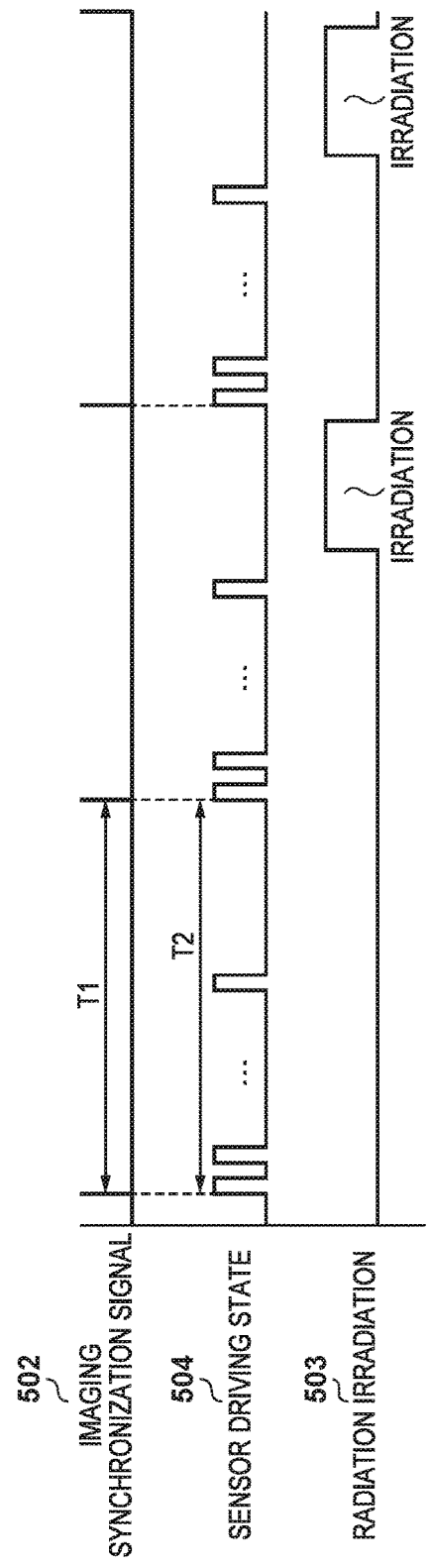

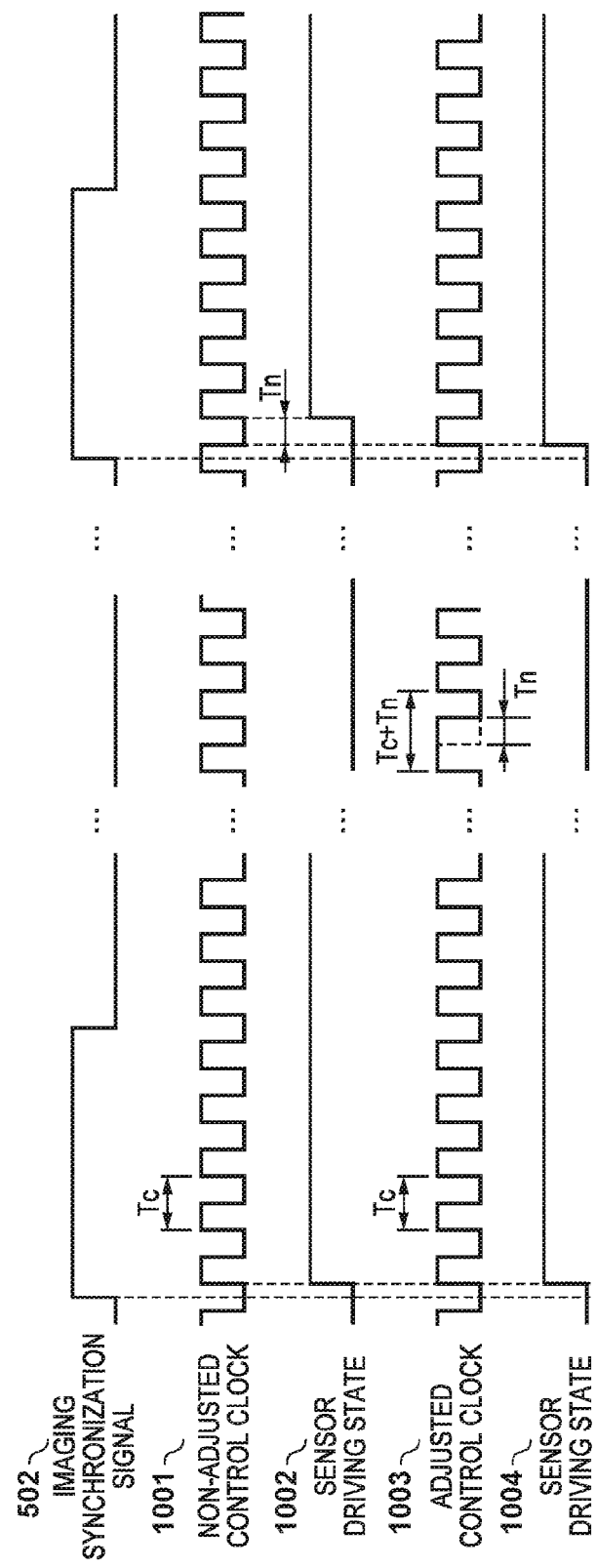

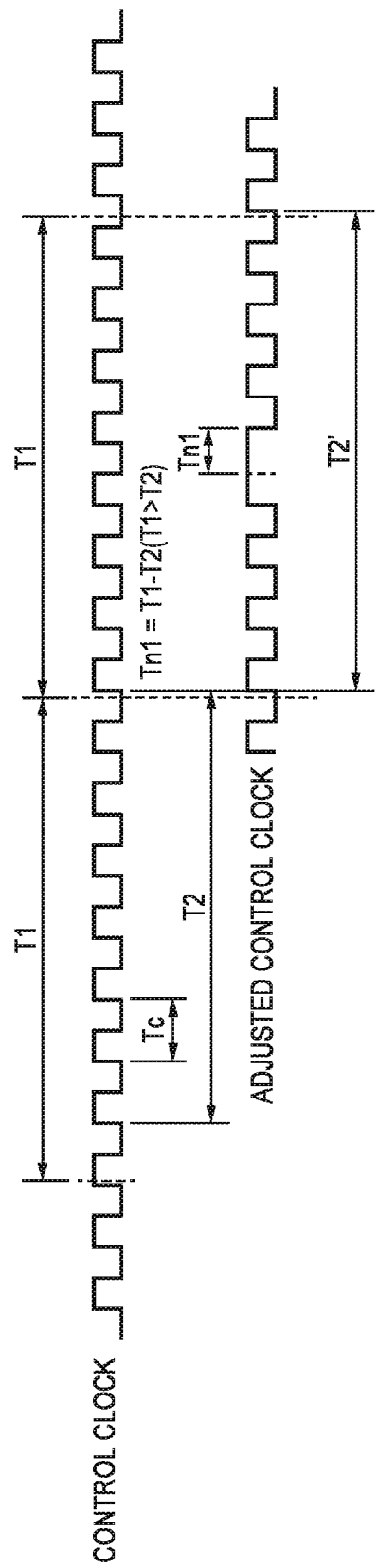

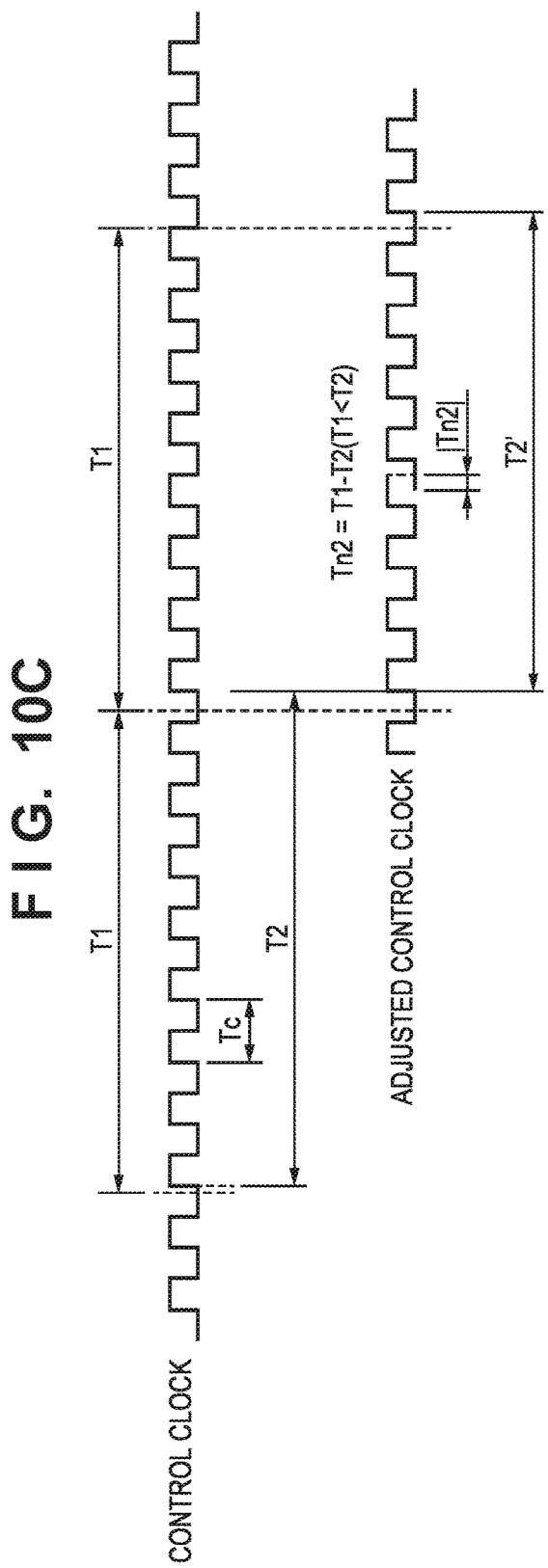

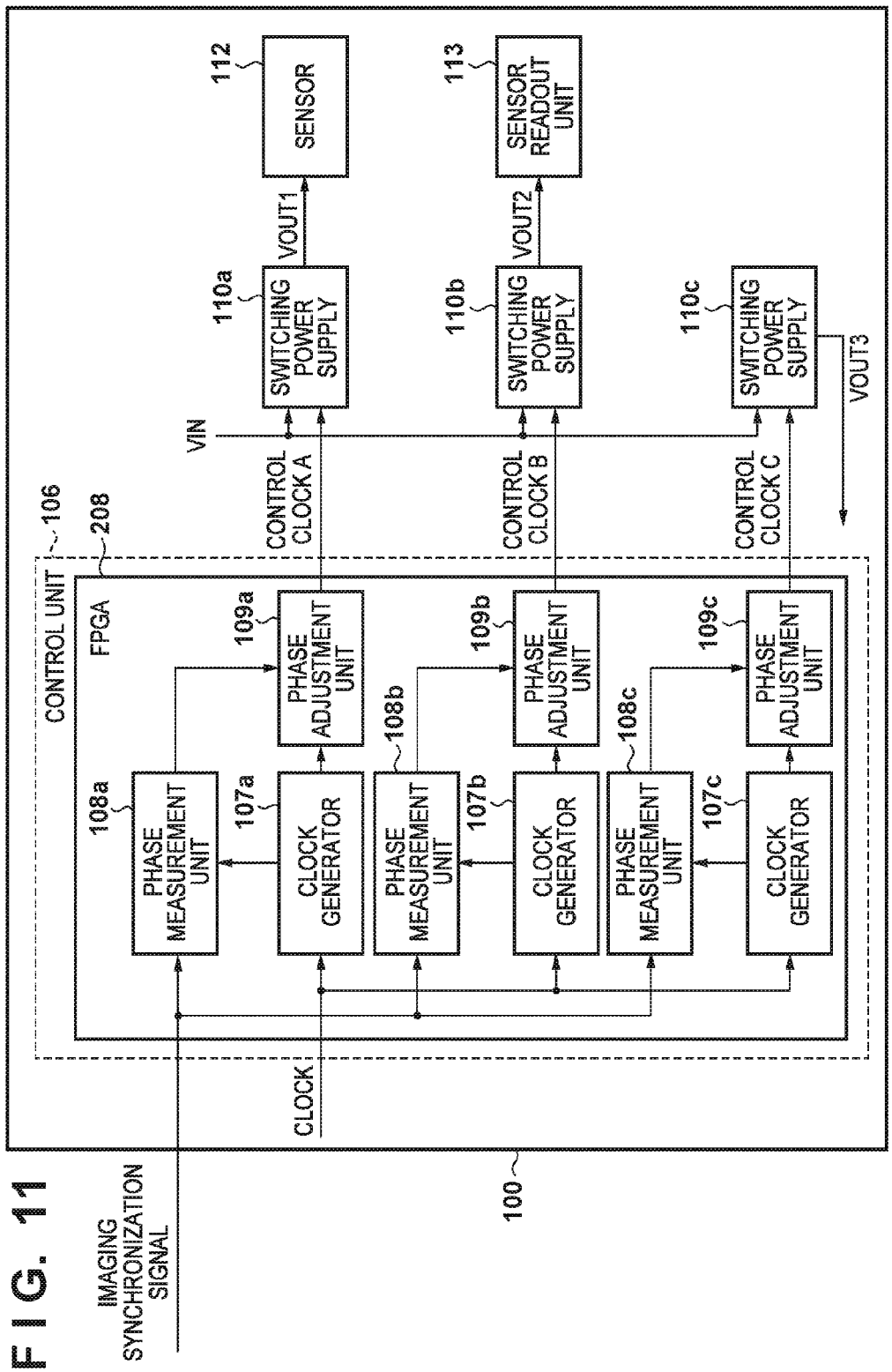

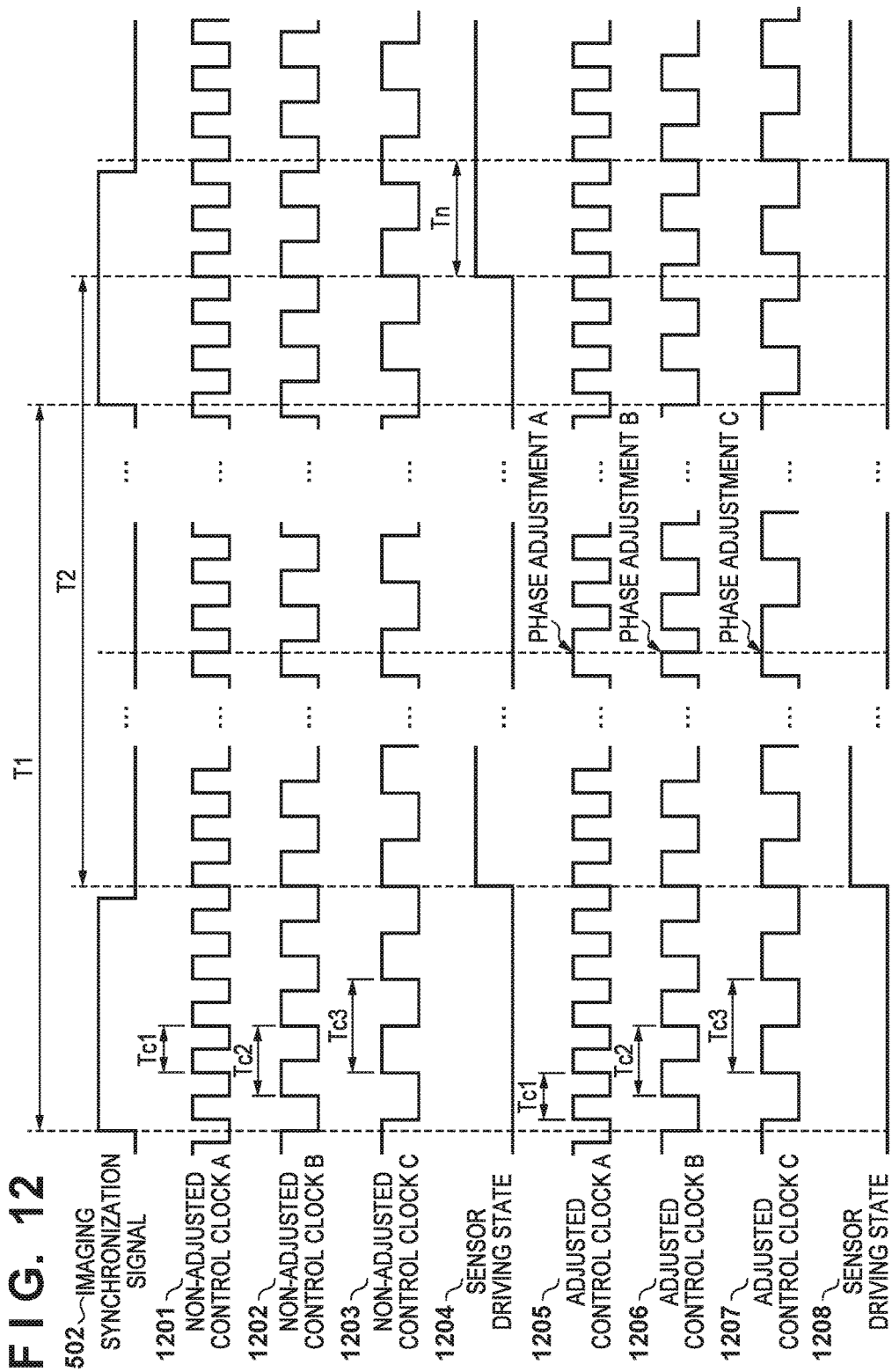

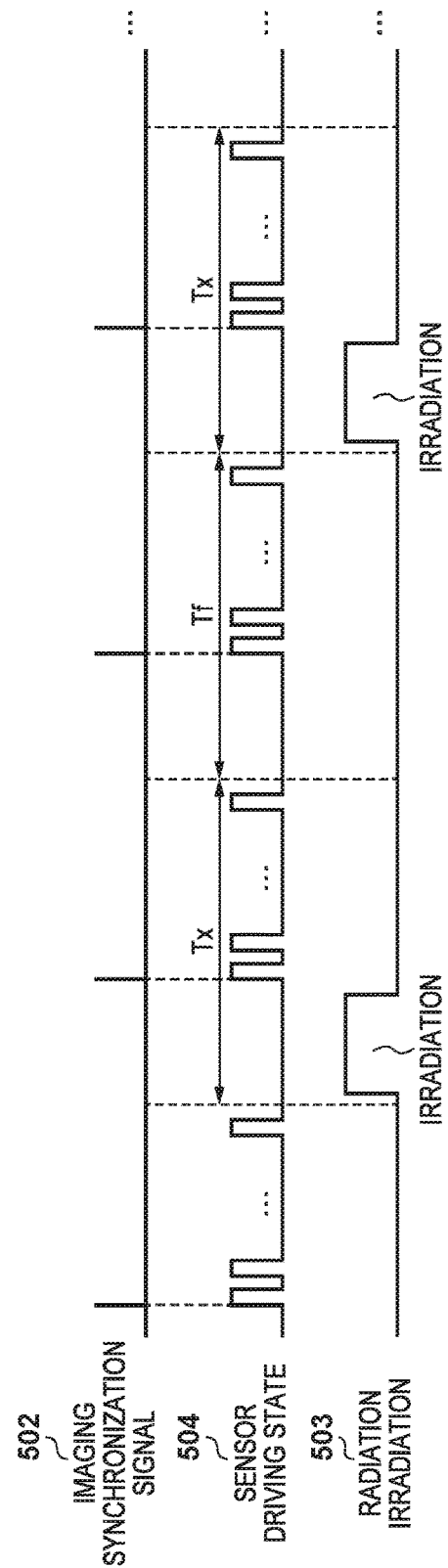

F I G. 14

| IMAGING MODE No. | VARIATION VALUE OF ACCUMULATION TIME | PHASE ADJUSTMENT VALUE WITH RESPECT TO SWITCHING FREQUENCY 1 [°] | PHASE ADJUSTMENT VALUE WITH RESPECT TO SWITCHING FREQUENCY 2 [°] |
|---|---|---|---|
| | | CYCLE OF SWITCHING FREQUENCY 1 | CYCLE OF SWITCHING FREQUENCY 2 |
| | | 6 | 5 |
| 1 | 12 | 0 | 144 |
| 2 | −34 | −240 | −288 |
| 3 | 8 | 120 | 216 |
| 4 | −15 | −180 | 0 |
| 5 | 6.05 | 3 | 75.6 |
| ... | ... | ... | ... |

RADIATION IMAGING APPARATUS AND METHOD OF CONTROLLING SAME

BACKGROUND OF THE INVENTION

Field of the Invention

The present invention relates to a radiation imaging apparatus and the method of controlling the same.

Description of the Related Art

A radiation image detector that generates a radiation image is commonly used in medical imaging diagnosis. A radiation image detector generates a radiation image by detecting an intensity distribution of radiation that is irradiated from the radiation generating apparatus that penetrates a subject. A typical radiation image detector has a sensor in which are arranged two-dimensionally pixels that include a switch element and a conversion element for converting the radiation into a charge. In the radiation image detector, the charge converted by a conversion element in each pixel is accumulated, the charge is read from each pixel by driving of the switch elements, and the radiation image is generated.

The radiation image detector is controlled so that a timing at which the radiation generating apparatus produces radiation and a timing at which the radiation image detector detects the radiation are synchronized. To realize this control, in Japanese Patent Laid-Open No. 2014-28033 (D1), a radiation imaging apparatus receives synchronization signals from an external image processing apparatus and a system control apparatus to thereby perform an image capturing operation and an image output operation.

Meanwhile, the radiation image detector internally includes a switching power supply such as a DC/DC power supply for supplying voltage to an internal circuit and sensors. The switching power supply is switched at a high frequency, causing high-frequency radiant noise or high-frequency propagation noise that traces the propagation path of the power supply to be produced. Therefore, noise based on the switching of the switching power supply is a factor in noise being caused to occur in a radiation image generated by the radiation image detector.

Japanese Patent No. 4235516 (D2) discloses a radiation image detector that performs selection of each line in pixels arranged two-dimensionally by a cycle that is an integer multiple of a switching cycle of a switching power supply, and performs switching and reading of a charge at the same timing for each line. By such control, it is possible to have noise in a radiation image not stand out.

However, D2 does not consider whatsoever a case of generating a radiation image in accordance with an imaging synchronization signal transmitted from outside of a radiation image detector, as recited in D1. When synchronizing an imaging synchronization signal and the switching operation of a switching power supply, a radiation image detector receives the imaging synchronization signal and then starts driving in accordance with a switching frequency. However, because the imaging synchronization signal and the switching operation are not in a synchronization relationship, in a period from reception of the imaging synchronization signal to the start of operation in accordance with the switching operation, accumulation period variation of a maximum of a cycle's worth of the switching frequency occurs. There is a possibility that, if such variation occurs, a charge accumulation period will change for each obtainment of a radiation image, and luminance (a pixel value) will differ for each radiation image.

SUMMARY OF THE INVENTION

A radiation imaging apparatus and a method of controlling the same according to an embodiment of the present invention reduce an influence on a radiation image due to a switching operation by a switching power supply.

According to one aspect of the present invention, there is provided a radiation imaging apparatus, comprising: a sensor configured to convert irradiated radiation into a charge in accordance with a radiation dose; a switching power supply configured to supply power to at least the sensor; a readout unit configured to readout a signal corresponding to the charge from the sensor in synchronism with an imaging synchronization signal and a control clock for a switching operation of the switching power supply; and an adjustment unit configured to adjust a phase of the control clock in each cycle of the imaging synchronization signal so that the timing of the imaging synchronization signal that occurs cyclically is at the same phase with respect to the control clock.

Also, according to another aspect of the present invention there is provided a control method of a radiation image apparatus provided with a sensor configured to convert irradiated radiation into a charge in accordance with a radiation dose, a switching power supply configured to supply power to at least the sensor, and a readout unit configured to readout a signal corresponding to the charge from the sensor, the method comprising: causing an execution of a readout of a signal by the readout unit in synchronism with an imaging synchronization signal and a control clock for a switching operation of the switching power supply; and adjusting a phase of the control clock in each cycle of the imaging synchronization signal so that the timing of the imaging synchronization signal that occurs cyclically is at a same phase with respect to the control clock.

Furthermore, according to another aspect of the present invention, there is provided a non-transitory computer-readable storage medium storing a program for causing a computer of a radiation imaging apparatus provided with a sensor configured to convert irradiated radiation into a charge in accordance with a radiation dose, a switching power supply configured to supply power to at least the sensor, and a readout unit configured to readout a signal corresponding to the charge from the sensor, to execute a control method comprising: causing an execution of a readout of a signal by the readout unit in synchronism with an imaging synchronization signal and a control clock for a switching operation of the switching power supply; and adjusting a phase of the control clock in each cycle of the imaging synchronization signal so that the timing of the imaging synchronization signal that occurs cyclically is at a same phase with respect to the control clock.

Further features of the present invention will become apparent from the following description of exemplary embodiments (with reference to the attached drawings).

BRIEF DESCRIPTION OF THE DRAWINGS

FIG. 9 is a timing chart for explaining a calculation of a variation amount of an accumulation period according to the first embodiment.

FIG. 10A is a timing chart for explaining an adjustment of a control clock according to the first embodiment.

FIG. 10B and FIG. 10C are timing charts for explaining adjustment of a control clock according to the first embodiment.

FIG. 11 is a view for explaining a functional configuration for a switching power supply according to a second embodiment.

FIG. 12 is a timing chart for explaining adjustments of control clocks according to the second embodiment.

FIG. 13 is a timing chart of a sensor driving shape and radiation irradiation by the third embodiment.

FIG. 14 is a view that illustrates a data configuration example of a table that registers phase adjustment amounts for each imaging mode.

DESCRIPTION OF THE EMBODIMENTS

Explanation is given below regarding several suitable embodiments of the present invention with reference to the attached drawings.

First Embodiment

Figure 1:
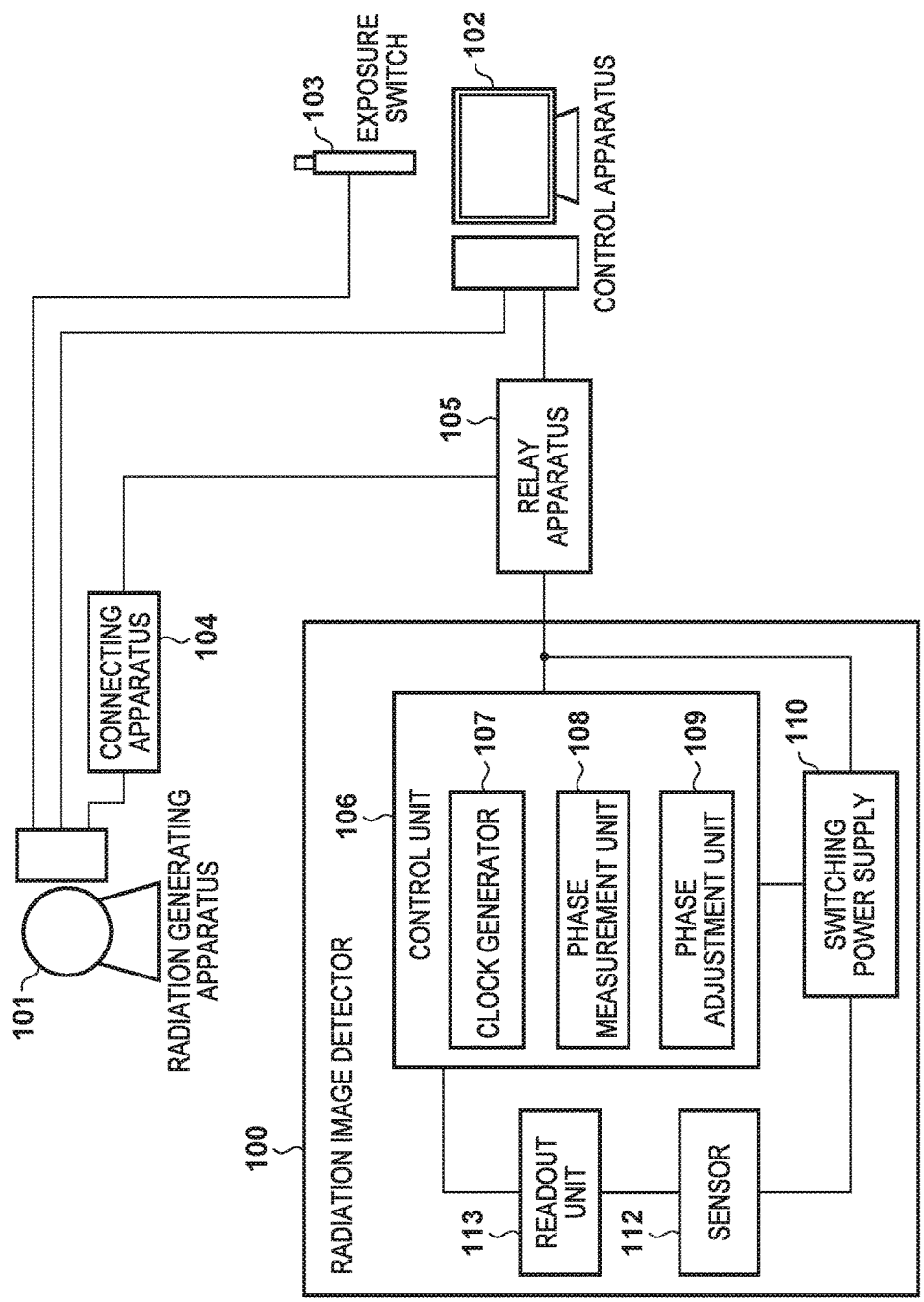
FIG. 1 is a view illustrating an example of a configuration of a radiation imaging system of a first embodiment.

FIG. 1 illustrates an example of a configuration of a radiation imaging system that uses a radiation image detector 100. The radiation imaging system of the first embodiment has the radiation image detector 100 as a radiation imaging apparatus, a radiation generating apparatus 101, a connecting apparatus 104, an exposure switch 103, a relay apparatus 105, and a control apparatus 102. When the exposure switch 103 is pressed, the radiation generating apparatus 101, via the relay apparatus 105 and the connecting apparatus 104 which intermediate communication, performs an exchange, with the radiation image detector 100, of control signals that include an imaging synchronization signal for performing irradiation and imaging of radiation. A radiation image imaged by the radiation image detector 100 is sent to the control apparatus 102 via the relay apparatus 105, and is displayed on a display device by the control apparatus 102. In addition, the control apparatus 102 is connected to the radiation generating apparatus 101, and can perform control of the radiation imaging system as a whole.

The radiation image detector 100 has a sensor 112, a readout unit 113, a switching power supply 110, and a control unit 106 inside. The switching power supply 110 converts a voltage of a direct-current power supply that is converted from a commercial power supply by the relay apparatus 105, and supplies necessary power to each unit including at least the sensor 112. The sensor 112 converts irradiated radiation into a charge in accordance with a radiation dose. The readout unit 113 synchronizes an imaging synchronization signal and a control clock for a switching operation of the switching power supply 110, and reads out a signal (an image signal) in accordance with the charge from the sensor 112. In this way, the image signal (information of a dose of radiation) obtained by the sensor 112 is read out by the readout unit 113, and sent to the control unit 106 as radiation image data. The control unit 106 sends the radiation image data to the control apparatus 102 via the relay apparatus 105. At this time, configuration may be taken such that the control unit 106 sends the data to the relay apparatus 105 after performing signal/image processing using offset correction, gain correction, and defective pixel correction functions on the radiation image data sent from the readout unit 113.

In addition, the control unit 106 of the present embodiment has a clock generator 107, a phase measurement unit 108, and a phase adjustment unit 109 for controlling a switching operation of the switching power supply 110. A switching operation of the switching power supply 110 is performed in accordance with a control clock supplied by the clock generator 107. Accordingly, a frequency of the control clock is equal to a switching frequency. The phase measurement unit 108 has a function for measuring a phase difference of the switching frequency produced by the clock generator 107, with respect to an imaging synchronization signal sent from the radiation generating apparatus 101. The phase adjustment unit 109 adjusts the phase of the control clock in each cycle of the imaging synchronization signal so that the timing of the imaging synchronization signal which is produced cyclically has the same phase as the control clock. In the present embodiment, the phase adjustment unit 109 adjusts the phase of the control clock produced by the clock generator 107, based on the phase difference measured by the phase measurement unit 108.

Note that the configuration illustrated in FIG. 1 is an example, and it goes without saying that a device that can be connected to use the radiation image detector 100 is not limited to those illustrated. In addition, a connection between devices may be either wireless or wired, and an order of connecting devices is not limited to that illustrated. In addition, for correction processing with respect to an obtained radiation image, a method thereof is not limited.

Figure 2:
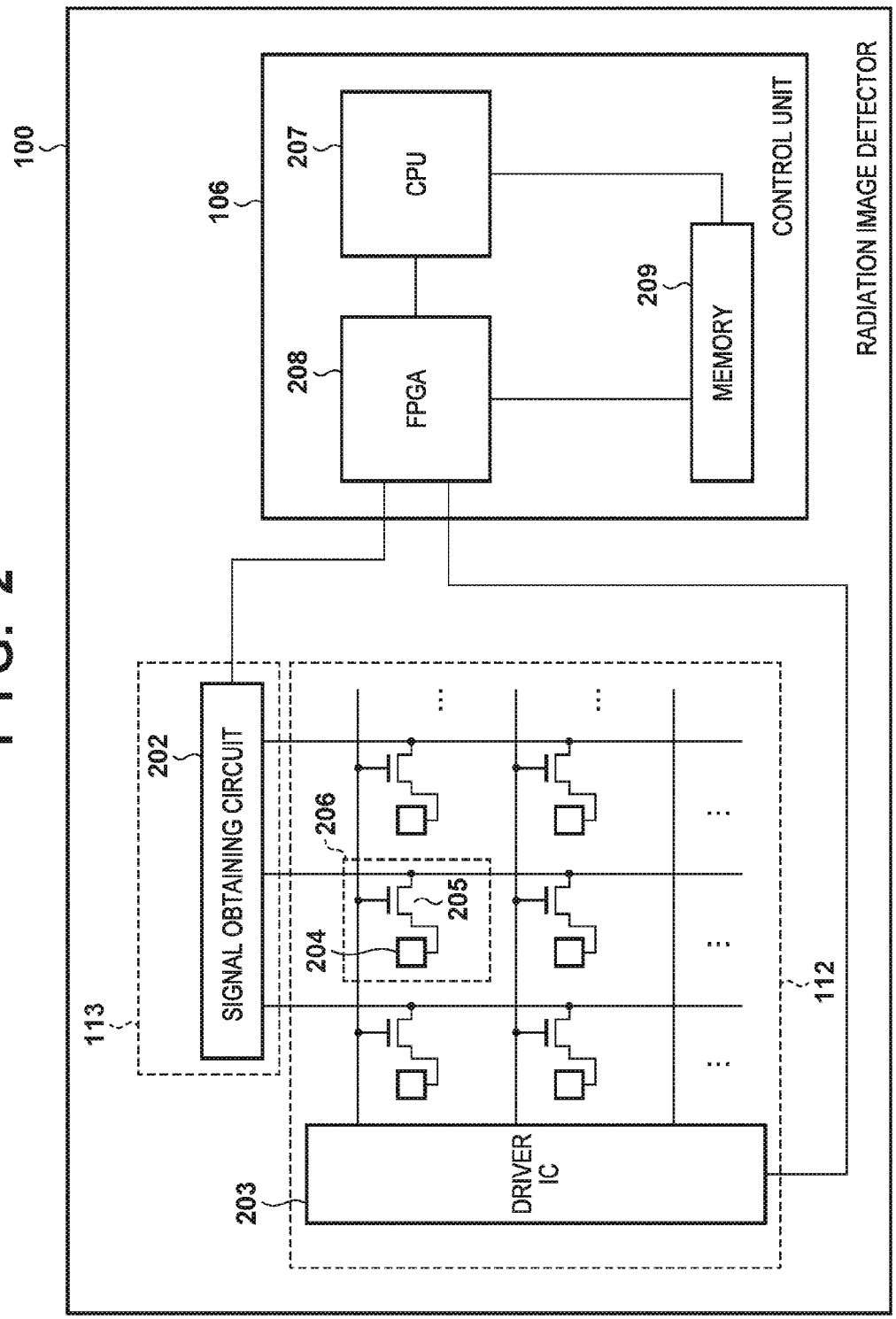
FIG. 2 is a hardware configuration diagram of a radiation image detector of the first embodiment.

FIG. 2 illustrates an example of a hardware configuration of the sensor 112, the readout unit 113, and the control unit 106, which are integrated in the radiation image detector 100. The control unit 106 is equipped with a CPU 207, an FPGA 208 (Field-Programmable Gate Array), and a memory 209 that includes a ROM and/or a RAM. In the control unit 106, functions of the clock generator 107, the phase measurement unit 108, and the phase adjustment unit 109 are realized by execution by the CPU 207 of a program stored in the memory 209, a processing operation by the FPGA 208, and/or cooperation by the CPU 207 and the FPGA 208.

The sensor 112 is equipped with a driver IC 203, and a plurality of a pixel 206 that is configured by a photoelectric conversion element 204, and a switch element 205. The quantity of the pixel 206 is the number of pixels of the radiation image detector 100. The readout unit 113 has a signal obtaining circuit 202 that is configured by an amplifier IC for amplifying a signal, and an ADC (Analog Digital Converter) for converting an analog signal to a digital signal.

The driver IC 203 selects and drives a line wire (a line), to turn the switch element 205 of the pixel 206 connected to the selected line wire ON. From the pixel 206 for which the switch element 205 has been turned ON, an image signal (charge) accumulated in the photoelectric conversion element 204 is output to the column wiring. The image signal outputted to the column wiring is amplified by the signal obtaining circuit 202, and converted to digital data. The driver IC 203 sequentially selects line wires under the control of the control unit 106, and image data (a radiation image) is obtained by the signal obtaining circuit 202 digitizing image signals output to the column wiring.

Figure 3:
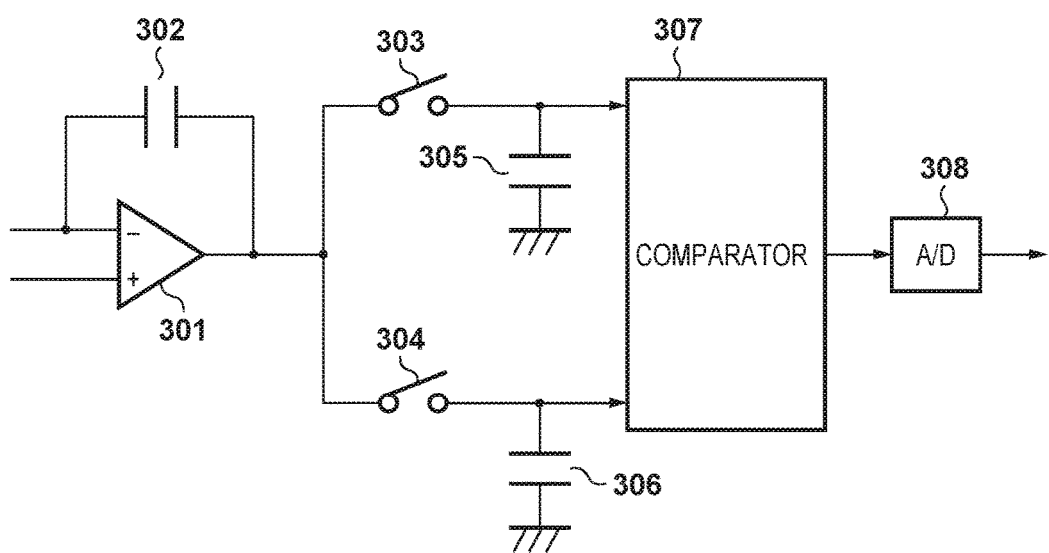
FIG. 3 is a view illustrating an example of a configuration of an amplifier IC and an ADC of the first embodiment.

FIG. 3 illustrates an internal configuration example of the signal obtaining circuit 202. An amplifier IC portion has a preamplifier 301 for each column wiring, capacitors 302, 305, and 306, and switch elements 303 and 304. A signal outputted to the column wiring from the photoelectric conversion element 204 is amplified by an integrating circuit configured by the preamplifier 301 and the capacitor 302. By turning the switch element 303 ON, a charge that corresponds to the amplified signal is accumulated in the capacitor 305, and by turning the switch element 304 ON, a charge corresponding to the amplified signal is accumulated in the capacitor 306. In the present embodiment, signal sample and hold is performed by turning the switch element 303 ON, and noise sample and hold is performed by turning the switch element 304 ON. Description is given later regarding signal sample and hold and noise sample and hold. By comparing, by a comparator 307, the charge accumulated in the capacitor 305 and the charge accumulated in the capacitor 306, a net amplification accumulated signal that excludes a signal amount that the photoelectric conversion element 204 outputs during accumulation of a charge is obtained. The obtained amplification accumulated signal is digitized by an ADC 308, and sent to the control unit 106 as image data. At this point the control unit 106 may perform signal processing or image processing with respect to received image data. Note that a configuration illustrated in FIG. 2 and FIG. 3 is an example, and there is no limitation to this.

Figure 4:
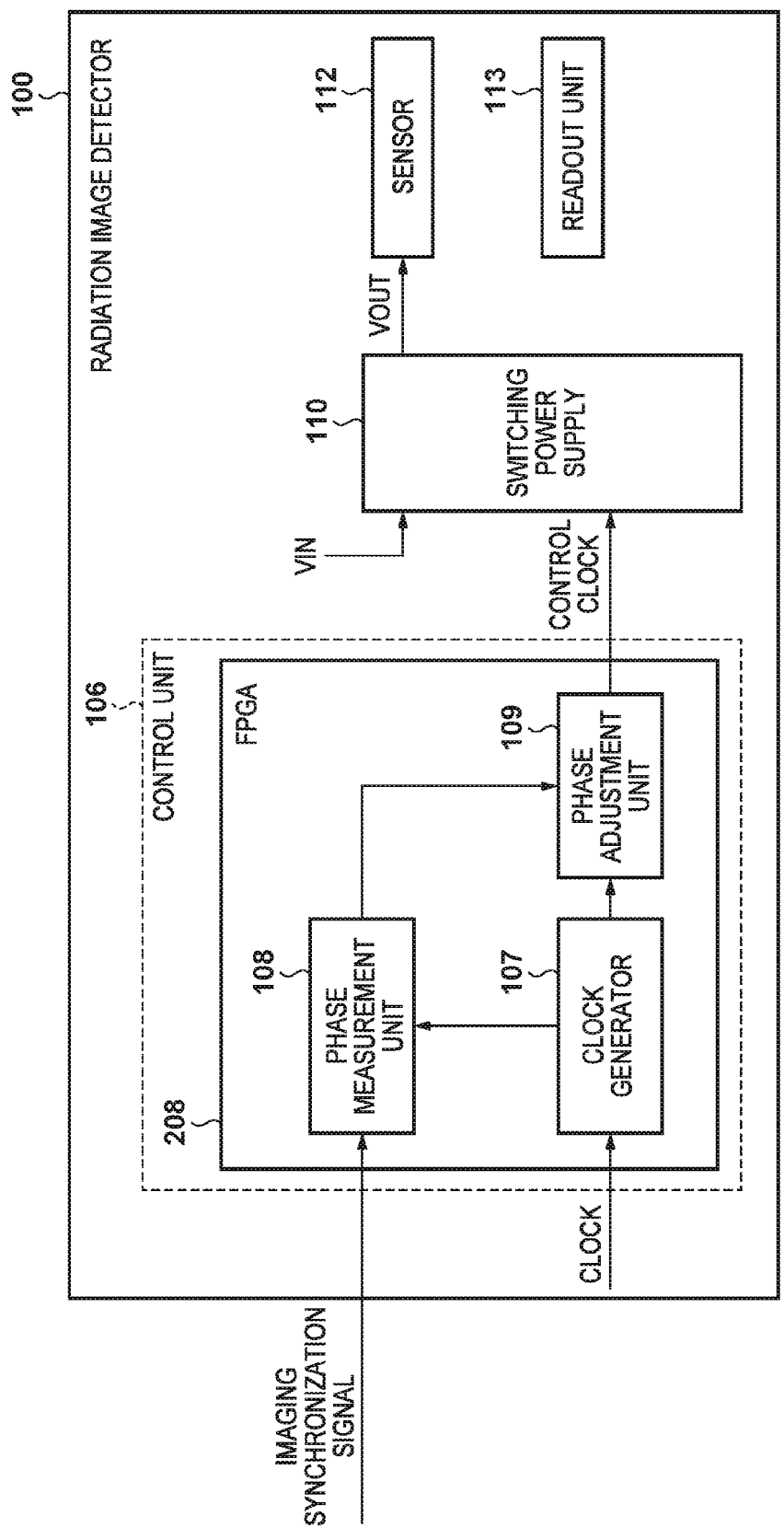
FIG. 4 is a view for explaining a functional configuration for a switching power supply according to the first embodiment.

FIG. 4 illustrates an example of a configuration of the switching power supply 110 and the control unit 106 in the radiation image detector 100. The clock generator 107 in the FPGA 208 produces a control clock for a switching operation of the switching power supply 110, by multiplying/dividing a clock generated by a quartz oscillator (not shown) or the like in the radiation image detector 100. The phase measurement unit 108 measures a phase difference between a control clock produced by the clock generator 107 and an imaging synchronization signal sent from the radiation generating apparatus 101. The phase adjustment unit 109 adjusts the phase of the control clock produced by the clock generator 107, based on the phase difference measured by the phase measurement unit 108. The switching power supply 110 performs a switching operation in accordance with the adjusted control clock, and converts a voltage VIN of a direct-current power supply, which is converted from a commercial power supply by the relay apparatus 105, to a different voltage VOUT. The converted voltage VOUT is used for power for the sensor 112. In addition, it is possible to convert the converted voltage VOUT by an LDO (Low Drop Out) regulator (not shown), and use it for power for circuits in the control unit 106 or the readout unit 113.

Figure 5:
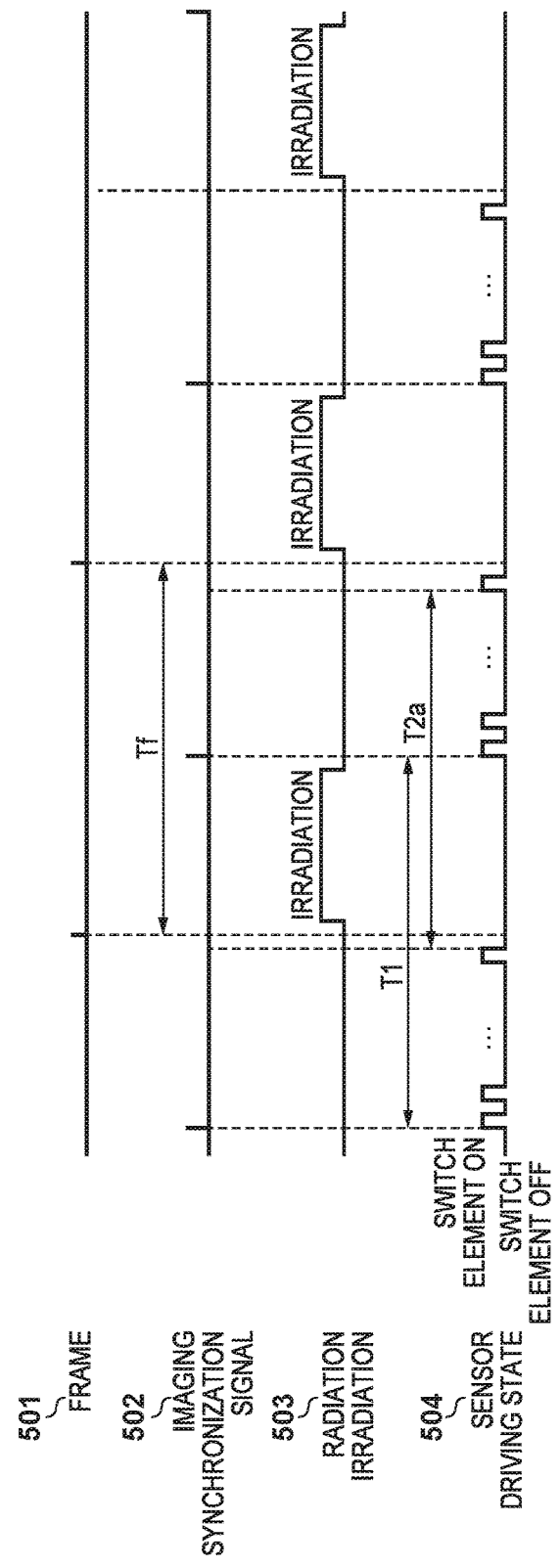
FIG. 5 is a timing chart of an imaging synchronization signal, radiation irradiation, and a sensor driving state.

FIG. 5 illustrates a timing chart of a driving state of the sensor 112 and radiation irradiation. In FIG. 5, reference numeral 501 indicates a frame timing, and reference numeral 502 indicates timing of an imaging synchronization signal transmitted by the radiation generating apparatus 101. In addition, reference numeral 503 indicates timing of radiation irradiation irradiated by the radiation generating apparatus 101, and reference numeral 504 indicates timing of a sensor driving state controlled by the driver IC 203. Tf indicates a period of one frame, T1 indicates a period between imaging synchronization signals, and T2a indicates a period (an interval from the end of a readout for one line wire until the next readout) in which each photoelectric conversion element 204 is during accumulation in accordance with sensor driving. When the imaging synchronization signal 502 is inputted, ON/OFF of the switch element 205 is repeated with units of line wires in accordance with the driver IC 203 as illustrated by the sensor driving state 504, and readout of signals from column wiring is performed by the signal obtaining circuit 202. At this point, configuration may be taken to cause a plurality of line wires to operate simultaneously, and configuration may be taken to skip reading of a line wire.

The sensor driving state enters an accumulation state after readout of signals has ended in accordance with ON/OFF of the switch element 205. When radiation is irradiated by the radiation generating apparatus 101 at timing of the radiation irradiation 503 during a period of the accumulation state, a charge is accumulated in the photoelectric conversion element 204 for each pixel in accordance with the irradiated radiation. The charge accumulated in the photoelectric conversion element 204 is read out and imaged when the sensor driving state 504 is next active. In moving image capturing, the previously described operation is repeated for each frame of a moving image. In such a case, it is possible to obtain a clear image by performing an offset correction that subtracts an offset image, obtained in a state in which radiation is not irradiated, from an imaged image. Note that, for the offset image, something obtained prior to moving image capturing may be used. In addition, configuration may be taken to adjust the sensor driving state 504 and the timing of the radiation irradiation 503, in accordance with a frame rate of the moving image.

Figure 6:
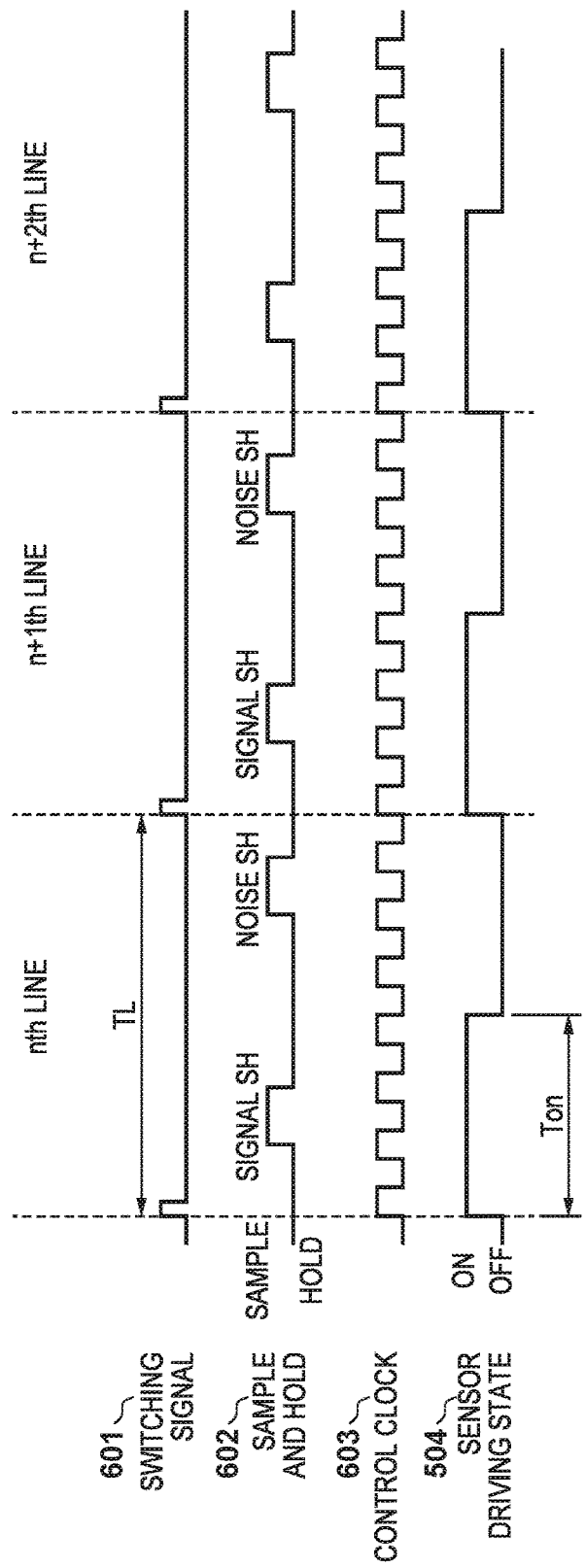
FIG. 6 is a timing chart for sensor readout in units of line wires.

FIG. 6 illustrates a timing chart for sensor readout in units of line wires. In addition, FIG. 7 illustrates a relationship between sample and hold and a signal to which switching noise produced by the switching power supply 110 is overlapped.

In FIG. 6, reference numeral 601 indicates a timing of a switching signal for switching a selected line wire. The driver IC 203 sequentially switches a selection of a line wire in accordance with a switching signal 601. In accordance with the switching signal 601, the driver IC 203 turns the switch element of the pixel 206 connected to the selected line wire ON. As illustrated by the timing of the sensor driving state 504, the driver IC 203 switches ON/OFF of the switch element 205 which is connected to the selected line. The switch element 205 enters an ON state only for a predetermined period Ton from the switching signal 601, and thereafter enters an OFF state for a remaining period (the period of TL-Ton).

Reference numeral 602 indicates a timing of sample and hold performed by the ADC 308 of the signal obtaining circuit 202, and reference numeral 603 indicates a timing of the control clock inputted to the switching power supply 110. TL indicates a read time for one line wire. In one TL period, a signal sample and hold is performed while the switch element 205 is in the ON state, and a noise sample and hold is performed while the switch element 205 is in the OFF state. As mentioned previously, a net amplification accumulated signal is obtained in accordance with a comparison of signals obtained by the signal sample and hold and the noise sample and hold.

Figure 7:
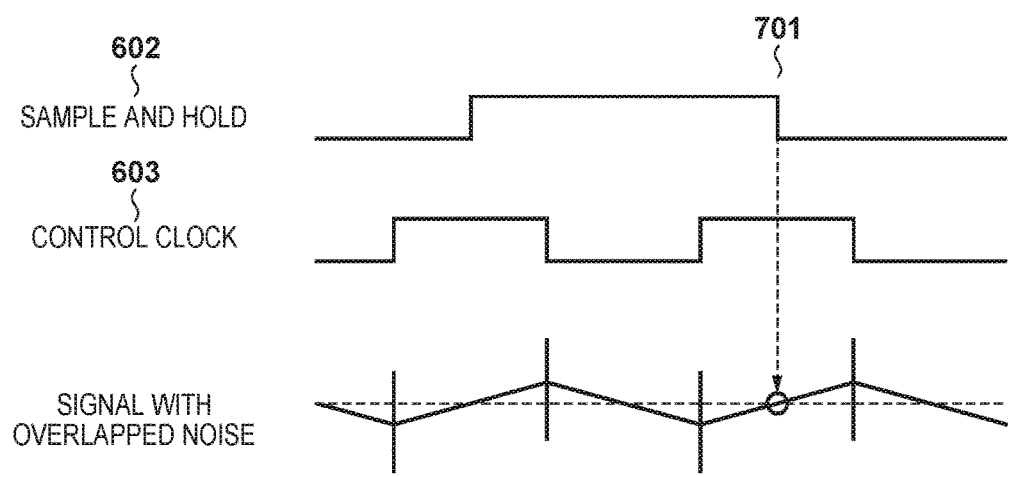
FIG. 7 is a view for illustrating a relationship between noise due to a switching power supply, and sample and hold.

As illustrated in FIG. 7, in synchronization with the switching frequency, the switching power supply 110 produces ripple noise (simply represented as a triangle wave) and spike noise produced at the timing of the switching. The ripple noise and the spike noise exert an influence on a signal component as propagation noise that propagates on a communication path, or radiant noise that propagates in space. Accordingly, to cause the influence of noise to be unified, it is necessary to cause the noise sample and hold and the signal sample and hold in all line wires to synchronize with the switching operation (the control clock). As a consequence, it is necessary for the start of each frame and the switching of line wires to synchronize with the switching operation (the control clock) of the switching power supply 110. In addition, to obtain an image having low noise, it is desirable to perform a sample and hold at a timing (for example the timing 701) when the influence of switching noise (ripple noise and spike noise) becomes small.

Figure 8:
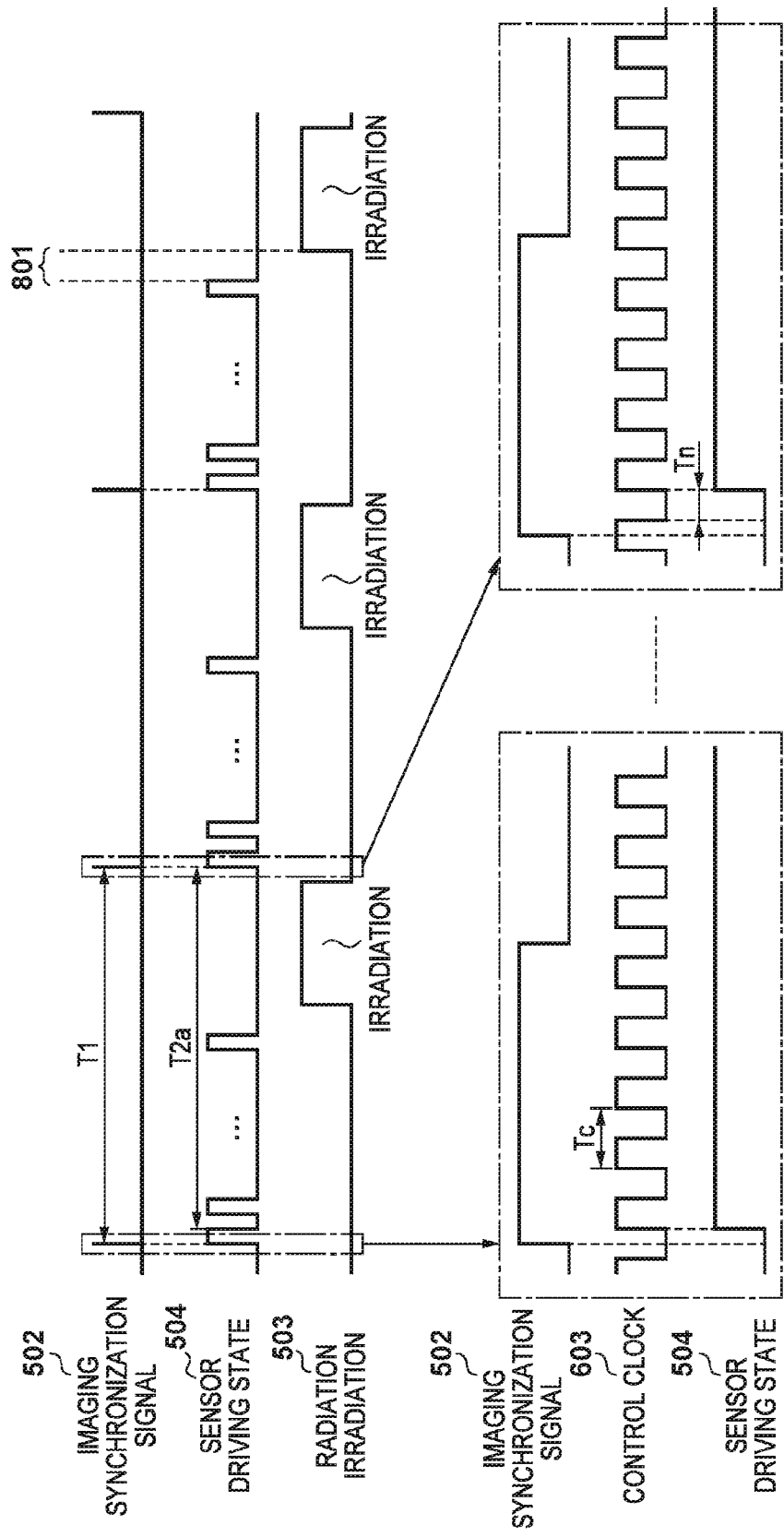
FIG. 8 is a timing chart of a sensor readout operation and an imaging synchronization signal of the first embodiment.

FIG. 8 illustrates a timing chart for an imaging synchronization signal and sensor readout. With the imaging synchronization signal 502 as a trigger, sensor driving (the sensor driving state 504) is performed in synchronization with the control clock 603. In the example of FIG. 8, an accumulation period is started from a leading edge of the control clock 603 immediately after the imaging synchronization signal 502. Taking the cycle of the imaging synchronization signal 502 as T1 and the accumulation period as T2a, for example if T1 and T2a are in a relationship as illustrated in FIG. 8, there are cases in which a variation of the accumulation period, illustrated by Tn, occurs for each frame. In such a case, there is a possibility that the accumulation period T2a for charge will change for each obtainment of a radiation image, and luminance (a pixel value) will differ for each radiation image.

The phase measurement unit 108 measures the interval of the imaging synchronization signal and the interval of a readout, by the readout unit 113, from one line wire of the sensor 112. FIG. 9 is a timing chart for explaining an example of a calculation, performed by the phase measurement unit 108 of the present embodiment, of a phase difference between the control clock (a switching operation) and an imaging synchronization signal. In the present embodiment, the phase difference between the control clock and the imaging synchronization signal is calculated using an imaging frame that does not accompany radiation irradiation, before radiation imaging is performed. Note that it is possible to use a frame in which the following sensor driving is executed, as an imaging frame that does not accompany radiation irradiation and can be used to calculate the phase difference.

Sensor driving having an objective of sensor protection that is performed while waiting.

Sensor driving for setting the temperature of the sensor to an equilibrium state.

Sensor driving for preparing a sensor state when switching to imaging having different parameters such as a frame rate.

For example, in an imaging frame that does not accompany radiation irradiation, the phase measurement unit 108, after receiving an imaging synchronization signal transmitted by the radiation generating apparatus 101, uses a timer circuit to measure the period T1 until the next imaging synchronization signal is inputted. Such a timer circuit is created in advance in the FPGA 208 for example. In parallel with this, the phase measurement unit 108 measures the driving interval T2 for a specific line wire (for example, the first line wire). The driving interval T2 can also be measured by using a timer circuit created in advance in the FPGA 208. Note that the accumulation period is strictly speaking the interval (T2a in FIG. 5 and FIG. 8) from when the sensor driving state (the switch element 205) is turned off until it is next turned ON, as described above. However, as explained below, it is possible to use the driving interval T2 to obtain an adjustment amount for the control clock for setting the accumulation period to a constant. Below, for convenience, the driving interval T2 is deemed to be the accumulation period, and a difference between the driving time T2 and the interval T1 of the imaging synchronization signal is deemed to be a variation period for the accumulation period.

In the present embodiment, an adjustment amount for the phase is determined based on the difference between the interval T1 of the imaging synchronization signal and the time interval T2 which is the interval for readout of one line wire by the readout unit 113. The difference between T1 and T2 is obtained by using a subtraction circuit (not shown) created in advance in the FPGA 208. Below this difference is assumed to be an adjustment period Tn for the accumulation period with respect to the cycle T1 of the imaging synchronization signal. The adjustment period Tn for the accumulation period is then converted to a phase difference with respect to the control clock, from the cycle of the switching frequency. Note that a typical switching frequency of a switching power supply is from several hundred kHz to several MHz. Assuming hypothetically that the switching frequency is 500 kHz, a variation of the accumulation period in the range of up to 2 μs of the cycle of the switching frequency is produced.

FIG. 10A is a timing chart for explaining phase adjustment of the control clock which is performed by the phase adjustment unit 109. In FIG. 10A, a situation of phase adjustment when the interval of the imaging synchronization signal is Tc×(m+0.5) is illustrated (note that Tc is one cycle of the control clock, and m is a natural number). In FIG. 10A reference numeral 1001 indicates a control clock in a case of not performing phase adjustment, and reference numeral 1002 indicates a timing for sensor driving that synchronizes with the control clock 1001. In addition, reference numeral 1003 indicates a control clock for which phase adjustment of the present embodiment is performed, and reference numeral 1004 indicates a timing for sensor driving that synchronizes with the control clock 1003. The phase adjustment unit 109 adjusts the phase of the control clock based on the phase difference measured by the phase measurement unit 108. In FIG. 10A, a variation Tn for the accumulation period of a half cycle's worth of the switching frequency occurs each frame, as indicated in the control clock 1001 for which adjustment of the phase is not performed. Accordingly, phase adjustment for a period of a half cycle's worth of the switching frequency (−180°) is performed as illustrated in a control clock 1003.

Using FIG. 10B and FIG. 10C, further explanation is given regarding phase adjustment when the interval of the imaging synchronization signal is not Tc×(m+0.5). An imaging synchronization signal of FIG. 10B and FIG. 10C is assumed to be produced with the same cycle T1. However, due to differences in the relationship between the imaging synchronization signal and the phase of the control clock when measuring the driving interval T2, the measured driving interval T2 takes different values. As a result, adjustment periods Tn1 and Tn2, which are calculated using respective accumulation periods and measurement results, differ. Because the start of the driving interval is synchronized with the control clock, the sum of the absolute values of Tn1 and Tn2 is equal to the cycle Tc of the control clock.

In FIG. 10B, the phase measurement unit 108 measures the driving interval T2 and the interval T1 of the imaging synchronization signal 502 in the nth frame. In each subsequent frame, the phase adjustment unit 109 shifts the phase by Tn1 (=T1−T2). In the case of FIG. 10B, because T1>T2, Tn1 is a positive value, and the phase is shifted so that the cycle of the control clock is delayed by Tn1. More specifically, the phase is caused to be delayed by 2π·Tn1/Tc in each frame. As a result, the period from a timing of producing the imaging synchronization signal 502 until the leading edge of the control clock becomes aligned in each frame, imaging in accordance with an equal driving interval T2' is executed, and the accumulation period also becomes equal in each frame.

FIG. 10C illustrates adjustment of the control clock when the interval T1 of the imaging synchronization signal 502 measured by the phase measurement unit 108 is smaller than the measured time interval T2 (T1<T2). In such a case, because the adjustment period Tn2 is a negative value, the phase is shifted to advance the cycle of the control clock in each frame by |Tn2|. More specifically, the phase is caused to be advanced by 2π·|Tn2|/Tc in each frame. By this, as illustrated in FIG. 10C, in a frame where the control clock has been adjusted, periods from when the imaging synchronization signal 502 is produced until the leading edge of the control clock align.

Note that, in FIG. 10B and FIG. 10C, time intervals T2' for reading in frames for which the control clock is adjusted are the same. This is because, as described above, Tn1+|Tn2|=Tc, and causing the phase to be delayed by Tn1 provides the same result as advancing the phase by Tn2. In addition, in FIG. 10B it is assumed that the length of one control clock in each frame is Tc+Tn1, and in FIG. 10C it is assumed that the length of one control clock in each frame is Tc−|Tn2|. Because Tn1+|Tn2|=Tc for adjustment of these control clocks, it is equivalent to setting one control clock in each frame to the length of Tc+(T1−T2).

Note that a frame for measuring the time interval T2 and the cycle T1 of the imaging synchronization signal is set to be before obtaining an image for offset correction (a dark image), and an adjusted control clock is used for obtainment of the offset correction and obtainment of a radiation image. Accordingly, imaging frames that does not accompany radiation irradiation for two frames from the imaging synchronization signal until the start of imaging are required.

Figure 15:
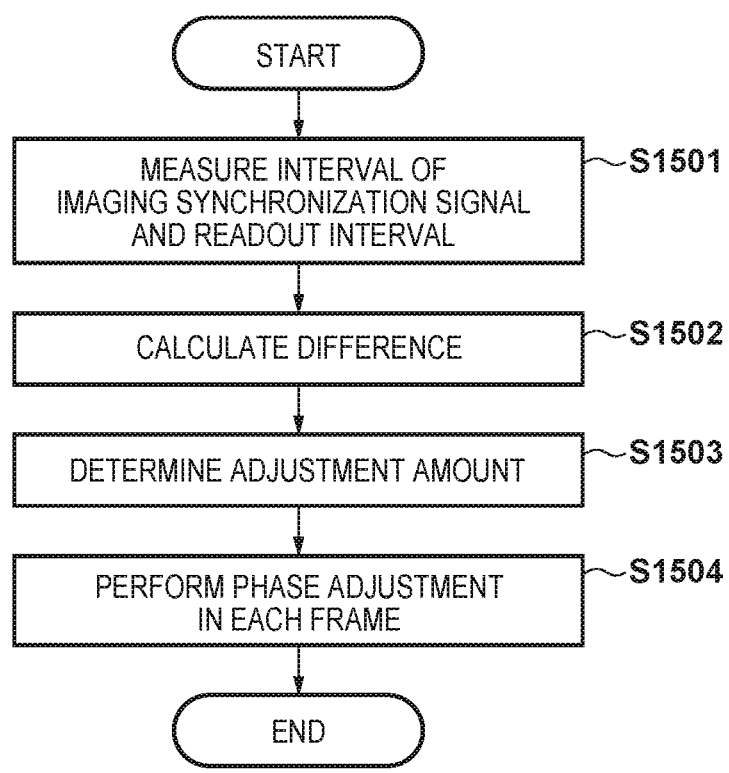
FIG. 15 is a flowchart for explaining processing for adjusting a control clock according to the first embodiment.

FIG. 15 is a flowchart illustrating operation of the control unit 106 according to the first embodiment. In the present embodiment, processing illustrated in FIG. 15 is realized by the phase adjustment unit 109 and the phase measurement unit 108 which are realized by the FPGA 208. Note that at least some of the processing illustrated in FIG. 15 may be realized by the CPU 207 executing a program stored in the memory 209.

The phase measurement unit 108 measures the interval T1 of the imaging synchronization signal, and the interval T2 of reading by the readout unit 113 (step S1501). Next, the phase measurement unit 108 calculates a difference between the measured T1 and T2 (step S1502), and determines an adjustment amount for the phase by dividing the calculated difference by the cycle of the control clock to convert it to a phase (step S1503). The phase adjustment unit 109 then uses the determined adjustment amount to adjust the phase of the control clock in each cycle of the imaging synchronization signal. Upon starting adjustment of the control clock in this way, the radiation image detector 100 starts radiation imaging by notifying exposure permission to the radiation generating apparatus 101, for example.

As described above, by performing phase adjustment of the switching frequency based on a variation amount of the accumulation period in every frame, periods from when the imaging synchronization signal 502 is inputted until the first leading edge of the control clock for a switching operation are aligned. As a result, the accumulation period is the same in the imaging of all frames for which phase adjustment has been performed. Note that, at a timing for changing the phase of the switching frequency, the voltage created by the switching power supply 110 changes. Therefore, it is desirable for adjustment of the phase to be performed at a timing where there is little influence, such as a timing when a readout by the readout unit 113 is not being performed. More desirable is for adjustment of the phase to be performed from the end of a readout of one image (frame) by a readout unit until a start of irradiation (for example, during the interval 801 of FIG. 8).

Note that, in the above embodiment, the interval T2 for a readout and the interval T1 of a synchronization signal for one frame are measured to calculate the adjustment period Tn of the accumulation period, but there is no limitation to this. Configuration may be taken to use a plurality of frames to obtain T1 and T2. In addition, configuration may be taken to obtain at least one of the interval T1 or the interval T2 with respect to a plurality of frames. If a plurality of frames are used, a plurality of the adjustment period Tn are obtained, and thus it is possible to use an average value thereof, and accuracy improves. However, for the adjustment period Tn which is the difference between the interval T2 for a readout and the interval T1 for the synchronization signal, there are cases when two types are obtained: the positive value Tn1 and the negative value Tn2 as described above. Because Tc=|Tn1|+|Tn2|, for example, if a value obtained by subtracting the absolute value of the interval T2 which is a negative value from the cycle Tc of the control clock is used to calculate the average value, an average value that corresponds to Tn1 will be obtained. In addition, a configuration for realizing a method for adjusting the control clock of the present embodiment is not limited to the above.

Second Embodiment

FIG. 11 is a view illustrating an example of a configuration of the switching power supply 110 and the control unit 106 in the radiation image detector 100 of a second embodiment. The radiation image detector 100 of the second embodiment has a plurality of switching power supplies 110a to 110c that operate at different switching frequencies. In addition, the FPGA 208 includes clock generators 107a to 107c, phase measurement units 108a to 108c, and phase adjustment units 109a to 109c that correspond to the plurality of switching power supplies 110a to 110c. In FIG. 11 illustration is given for a case of having three types of the switching power supply 110 as an example, but the number of the switching power supply 110 is not limited to this. In addition, a VOUT outputted by each switching power supply may be further converted by an LDO regulator. Even in the radiation image detector 100 illustrated in FIG. 11, as in the first embodiment it is desirable to have the sensor driving synchronize with each switching operation from the perspective of noise originating in a switching operation of the switching power supplies 110.

FIG. 12 is a timing chart illustrating states in which the control clock is adjusted for each of the plurality of switching power supplies, in the radiation image detector 100 of the second embodiment. Reference numerals 1201, 1202, and 1203 indicate control clocks A through C for which adjustment is not performed, for switching operations of each of the switching power supplies 110a, 110b, and 110c. Reference numeral 1204 indicates a timing relation between the sensor driving state and the control clocks 1201 to 1203 for which adjustment is not performed. Reference numeral 1205, 1206, and 1207 respectively indicate control clocks A through C for which the phase adjustment unit 109 has performed phase adjustment based on a result of phase measurement performed by the phase measurement unit 108. Reference numeral 1208 indicates a timing relation between the sensor driving state and the control clocks 1205 to 1207 for which phase adjustment is performed.

A method of obtaining a variation of the accumulation period is similar to that in the first embodiment. However, because there are a plurality of switching frequencies in the second embodiment, readout is started at a timing when the phase of the plurality of control clocks, which have differing frequencies for switching operations in the plurality of switching power supplies, are aligned. For example, the start of the accumulation period (the start of readout from the sensor 112 by the readout unit 113) is synchronized to a timing at which the leading edges of all the control clocks are first aligned. In the example of FIG. 12, the time interval T2 for readout is shorter than the cycle T1 of the imaging synchronization signal 502 by a period Tn. Each of the phase measurement units 108a to 108c obtain the phase difference by obtaining the adjustment period Tn between the interval T1 of the imaging synchronization signal and the accumulation period T2, and obtaining the period of a remainder of dividing Tn by the cycle of the switching frequency. Note that, in FIG. 11 a phase measurement unit is provided for each switching power supply, but this is no limitation to this. For example, configuration may be taken such that the adjustment period Tn is measured by one measurement unit, and then each of the phase adjustment units 109a to 109c use the adjustment period Tn to calculate the phase difference.

Each of the phase adjustment units 109a to 109c uses the obtained phase difference to adjust the phase of the control clock. Adjustment of the phase is performed so that a time difference between the timing of the synchronization signal and the timing at which the phases (for example the leading edge) of the plurality of control clocks align is constant. By executing this adjustment for every frame, a period from when the imaging synchronization signal occurs until a timing at which the leading edges of all of the control clocks align, in other words a period from when the imaging synchronization signal occurs until the start of accumulation, is aligned for all frames, and the accumulation period becomes constant.

In the example of FIG. 12, Tc2=1.5×Tc1, Tc3=2×Tc2, Tn=2.5×Tc1, and the phase adjustments A through C are as follows.

Phase adjustment A: The remainder of Tn/Tc1 is 0.5, and phase adjustment for a period of a half cycle (−180°) of the cycle Tc1 of the control clock 1205 is performed.

Phase adjustment B: The remainder of Tn/Tc2 is ⅔, and phase adjustment for a period of ⅔ of a cycle (−240°) of the cycle Tc2 of the control clock 1206 is performed.

Phase adjustment C: The remainder of Tn/Tc3 is ¼, and phase adjustment for a period of ¼ of a cycle (−90°) of the cycle Tc3 of the control clock 1207 is performed.

Note that, in FIG. 12, phase adjustment is performed at the same timing for all control clocks, but there is no limitation to this. Configuration may be taken to separately perform, for each control clock, phase adjustment at a timing when an influence on change of the voltage that occurs at a time of phase adjustment is small.

Third Embodiment

FIG. 13 is an example of an overview of a timing chart for a driving shape of radiation irradiation and a sensor in the radiation image detector 100 of the third embodiment. In the configuration of the radiation image detector 100 of the third embodiment, an image (image obtained in Tf) is obtained in a state where radiation irradiation is not performed immediately prior or immediately after radiation imaging, and is used in an offset correction of a radiation imaging image (image obtained in Tx). Note that the configuration of the radiation image detector 100 in the third embodiment is similar to that in the first embodiment (FIG. 1, FIG. 2, and FIG. 4).

In the present embodiment, similarly to in the first embodiment, it is also possible to perform imaging that aligns the accumulation period of every frame, by performing, for every frame, phase adjustment of the control clock based on the calculated adjustment period Tn of the accumulation period. The radiation image and the image for offset correction for which radiation is not irradiated are obtained, and in the still image capturing for performing offset correction, by a similar method it is also possible to perform accurate still image capturing by suppressing a variation of luminance between the imaged images.

Fourth Embodiment

In the first embodiment and the second embodiment, the interval T1 for the imaging synchronization signal, the time interval T2 for readout, and the adjustment period Tn (the phase adjustment amount) are measured, but there is no limitation to this. In the fourth embodiment, a table (as shown in FIG. 14) holding in advance a variation value for the cycle of the imaging synchronization signal of the accumulation period for each imaging mode, and phase adjustment values in each switching frequency corresponding to the variation value of the accumulation period is used. Note that, in each imaging mode, for example the interval of the imaging synchronization signal differs, and thus the variation value of the accumulation period differs for each imaging mode. In addition, in the present embodiment, a case in which two switching power supplies (a switching power supply whose cycle time of switching frequency is "6" and a switching power supply whose cycle time of switching frequency is "5") having two different switching frequencies are used is described. The number of switching power supplies is not limited to that in this example, and it goes without saying that it may be one or may be three or more. For example, in the No. 1 imaging mode, the variation value of the accumulation period is "12". When the switching cycle time is "6", because a remainder thereof is 0, the phase adjustment value is 0°. When the switching cycle time is "5", because a remainder thereof is 2, phase adjustment for 360°×⅖=144° is performed. Furthermore, in the No. 5 imaging mode, the variation value of the accumulation period is 6.05. When the switching cycle time is "6", a remainder thereof is 0.05, so it is 360°×0.05/6=3°. When the switching cycle time is "5", because a remainder thereof is 1.05, phase adjustment for 360°×1.05/5=75.6° is performed.

The imaging mode is for example set to the radiation generating apparatus 101 in accordance with a user operation with respect to the control apparatus 102. The radiation generating apparatus notifies the imaging mode to the radiation image detector 100, and also starts transmission of the imaging synchronization signal in accordance with the imaging mode. Upon receiving the notification of the imaging mode, the radiation image detector 100 refers to the table to set a phase adjustment values for the control clock of each switching power supply. For example, if imaging mode No. 3 is notified, phase adjustment amounts are set: 120° for the control clock for the switching power supply having a switching frequency 1, and 216° for the control clock of the switching power supply having a switching frequency 2.

Note that, to improve the accuracy of correction that uses the table, it is desirable for the radiation image detector to have a correction mode for updating numerical values for each mode. In the correction mode, a method of calculating a variation value for the accumulation period, and a method of calculating an adjustment value for the phase in each switching frequency is similar to that in the first embodiment and the second embodiment.

Figure 16:
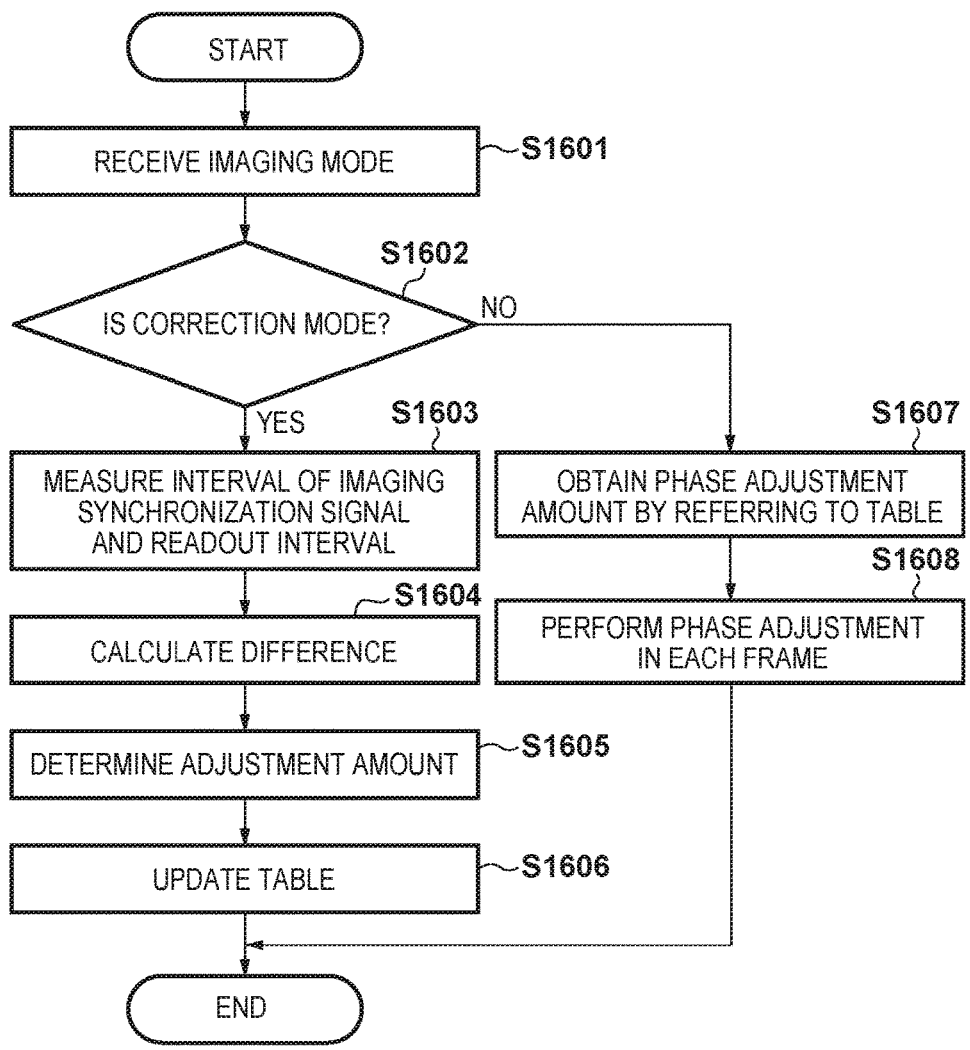
FIG. 16 is a flowchart for explaining processing for updating a table and processing for adjusting a control clock, according to a third embodiment.

FIG. 16 is a flowchart illustrating operation of the control unit 106 according to the fourth embodiment. In the present embodiment, function of the phase adjustment unit 109 and the phase measurement unit 108 of the FPGA 208 are realized by the CPU 207 executing a program stored in the memory 209. Note that function assignment for the CPU 207 and the FPGA 208 is not limited to that exemplified in the present embodiment.

The CPU 207 receives the imaging mode from the radiation generating apparatus 101 (step S1601). Note that the imaging mode may be received from the control apparatus 102. Next the CPU 207 determines whether the operation mode of the radiation image detector 100 is the correction mode. Setting of the correction mode may be set from an operation unit (not shown) provided in the radiation image detector 100, or may be set from the control apparatus 102. If the operation mode is not the correction mode, radiation imaging is executed in accordance with the received imaging mode in the present embodiment. Firstly, the phase adjustment unit 109 refers to a table as illustrated in FIG. 14, and obtains a phase adjustment amount set with respect to the imaging mode received in step S1601. The phase adjustment unit 109 then uses the adjustment amount obtained by referring to the table to adjust the phase of the control clock in each cycle of the imaging synchronization signal. Upon starting adjustment of the control clock in this way, the radiation image detector 100 starts radiation imaging by notifying exposure permission to the radiation generating apparatus 101, for example.

Meanwhile, if the correction mode is set, the phase measurement unit 108 measures the interval T1 of the imaging synchronization signal, and the interval T2 of reading by the readout unit 113 (step S1603). Next, the phase measurement unit 108 calculates a difference between the measured T1 and T2 (step S1604), and determines an adjustment amount for the phase by dividing the calculated difference by the cycle of the control clock to convert it to a phase (step S1605). If a plurality of switching power supplies are present, a phase adjustment amount is determined for each control clock. The CPU 207 uses the determined adjustment amount to update the details (accumulation period variation value or phase adjustment amount) of the table relating to the imaging mode received in step S1601.

By virtue of the fourth embodiment, by performing phase adjustment of the switching frequency for each frame of imaging in accordance with the numerical values registered in the table, it is possible to perform imaging in accumulation periods that are the same period of time for each frame.

As explained above, by each embodiment described above, in moving image capturing that causes generated radiation images to be consecutively displayed, a luminance difference between radiation images is controlled to be reduced, occurrence of variance in the screen is suppressed, and satisfactory image diagnosis can be performed. In addition, in each embodiment described above, explanation was mainly given for moving image capturing, but application is possible for imaging of an image for correction and a radiation image in still image capturing. For example, imaging of frames for moving image capturing may be allocated to imaging of a radiation image and imaging of an image for correction. Accordingly, by the embodiments described above, in still image capturing, accurate offset correction is possible by controlling such that accumulation periods are in accordance between the radiation image and a correction image for offset correction that is obtained without irradiating radiation.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112098, filed Jun. 3, 2016, which is hereby incorporated by reference herein in its entirety.

What is claimed is:

1. A radiation imaging apparatus, comprising:
    a sensor configured to convert irradiated radiation into a charge in accordance with a radiation dose;
    a switching power supply configured to supply power to at least the sensor;
    a readout unit configured to readout a signal corresponding to the charge from the sensor in synchronism with an imaging synchronization signal and a control clock for a switching operation of the switching power supply; and an adjustment unit configured to adjust a phase of the control clock in each cycle of the imaging synchronization signal so that the timing of the imaging synchronization signal that occurs cyclically is at the same phase with respect to the control clock, wherein the adjustment unit determines an adjustment amount for the phase based on a difference between an interval of the imaging synchronization signal and an interval of a readout of one line wire by the readout unit.

2. The apparatus according to claim 1, wherein the adjustment unit adjusts the phase at a timing when readout by the readout unit is not performed.

3. The apparatus according to claim 2, wherein the adjustment unit adjusts the phase in a duration from an end of readout of one image by the readout unit until a start of irradiation.

4. The apparatus according to claim 1, wherein in a case where a cycle of the control clock is Tc, the interval of the imaging synchronization signal is T1, and the interval of the readout is T2, the adjustment unit inserts one clock having a cycle of Tc+(T1−T2) into the control clock during the imaging synchronization signal.

5. The apparatus according to claim 1, further comprising a measurement unit configured to measure the interval of the imaging synchronization signal and the interval of the readout of the one line wire by the readout unit.

6. The apparatus according to claim 5, wherein the measurement unit measures the interval of the readout for a readout operation by the readout unit for which obtaining an image is not an objective.

7. The apparatus according to claim 6, wherein the measurement unit measures the interval of the readout for at least one readout operation of:
a readout operation for which protection of the sensor that is performed while waiting for imaging is an objective,
a readout operation for which setting a temperature of the sensor to an equilibrium state is an objective, and
a readout operation for preparing a state of the sensor when switching a parameter of imaging.

8. The apparatus according to claim 5, wherein the measurement unit obtains the difference for a plurality of frames, and
the adjustment unit determines the adjustment amount of the phase based on an average value of the obtained plurality of differences.

9. The apparatus according to claim 5, wherein the measurement unit measures the interval of the imaging synchronization signal or the interval of the readout for a plurality of frames to obtain an average value.

10. The apparatus according to claim 1, wherein the timing of the imaging synchronization signal is a timing of at least one of a leading edge and a trailing edge of a waveform of the imaging synchronization signal.

11. A radiation imaging apparatus, comprising:
a sensor configured to convert irradiated radiation into a charge in accordance with a radiation dose;
a switching power supply configured to supply power to at least the sensor;
a readout unit configured to readout a signal corresponding to the charge from the sensor in synchronism with an imaging synchronization signal and a control clock for a switching operation of the switching power supply; and
an adjustment unit configured to adjust a phase of the control clock in each cycle of the imaging synchronization signal so that the timing of the imaging synchronization signal that occurs cyclically is at the same phase with respect to the control clock, wherein the switching power supply includes a plurality of switching power supplies that operate by different switching frequencies, the readout unit starts the readout at a timing when phases of a plurality of control clocks of different frequencies for switching operations in the plurality of switching power supplies align, and the adjustment unit adjusts the phases of the plurality of control clocks in each cycle of the imaging synchronization signal so that a time difference between a timing of the imaging synchronization signal and the timing when the phases of the plurality of control clocks align is constant.

12. The apparatus according to claim 11, wherein the adjustment unit measures the time difference and adjusts the phase of each control clock based on a remainder of dividing the measured time difference by the cycle of each control clock.

13. The apparatus according to claim 11, further comprising a table configured to register, for each of the plurality of switching power supplies, phase adjustment amounts in accordance with the adjustment unit for each of a plurality of imaging modes that includes at least imaging modes having different intervals for an imaging synchronization signal, wherein
the adjustment unit obtains an adjustment amount in accordance with a notified imaging mode from the table.

14. The apparatus according to claim 13, further comprising an obtainment unit configured to measure a time difference between an interval of the imaging synchronization signal and an interval of the readout, and obtain an adjustment amount for the phase of each control clock based on a remainder of dividing the measured time difference by the cycle of the control clock, and
a correction unit configured to correct the table based on the adjustment amount obtained by the obtainment unit.

15. A radiation imaging apparatus, comprising:
a sensor configured to convert irradiated radiation into a charge in accordance with a radiation dose;
a switching power supply configured to supply power to at least the sensor;
a readout unit configured to readout a signal corresponding to the charge from the sensor in synchronism with an imaging synchronization signal and a control clock for a switching operation of the switching power supply; and
an adjustment unit configured to adjust a phase of the control clock in each cycle of the imaging synchronization signal so that the timing of the imaging synchronization signal that occurs cyclically is at the same phase with respect to the control clock, wherein
the adjustment unit executes an adjustment of the control clock in each of an operation for obtaining an image for offset correction in a state where radiation irradiation is not performed and an operation for obtaining a radiation image in a state where radiation irradiation is performed.

16. A radiation imaging apparatus, comprising:
a sensor configured to convert irradiated radiation into a charge in accordance with a radiation dose;

a switching power supply configured to supply power to at least the sensor;

a readout unit configured to readout a signal corresponding to the charge from the sensor in synchronism with an imaging synchronization signal and a control clock for a switching operation of the switching power supply;

an adjustment unit configured to adjust a phase of the control clock in each cycle of the imaging synchronization signal so that the timing of the imaging synchronization signal that occurs cyclically is at the same phase with respect to the control clock; and a table configured to register phase adjustment amounts in accordance with the adjustment unit for each of a plurality of imaging modes that includes at least imaging modes having different intervals for an imaging synchronization signal, wherein the adjustment unit obtains an adjustment amount in accordance with a notified imaging mode from the table.

17. The apparatus according to claim 16, further comprising an obtainment unit configured to measure a time difference between an interval of the imaging synchronization signal and an interval of the readout, and obtain the adjustment amount for the phase of the control clock based on the measured time difference, and a correction unit configured to correct the table based on the adjustment amount obtained by the obtainment unit.

18. A control method of a radiation image apparatus provided with a sensor configured to convert irradiated radiation into a charge in accordance with a radiation dose, a switching power supply configured to supply power to at least the sensor, and a readout unit configured to readout a signal corresponding to the charge from the sensor, the method comprising:

causing an execution of a readout of a signal by the readout unit in synchronism with an imaging synchronization signal and a control clock for a switching operation of the switching power supply; and adjusting a phase of the control clock in each cycle of the imaging synchronization signal so that the timing of the imaging synchronization signal that occurs cyclically is at a same phase with respect to the control clock, wherein an adjustment amount for the adjusting of the phase is determined based on a difference between an interval of the imaging synchronization signal and an interval of a readout of one line wire by the readout unit.

19. A non-transitory computer-readable storage medium storing a program for causing a computer of a radiation imaging apparatus provided with a sensor configured to convert irradiated radiation into a charge in accordance with a radiation dose, a switching power supply configured to supply power to at least the sensor, and a readout unit configured to readout a signal corresponding to the charge from the sensor, to execute a control method comprising:

causing an execution of a readout of a signal by the readout unit in synchronism with an imaging synchronization signal and a control clock for a switching operation of the switching power supply; and adjusting a phase of the control clock in each cycle of the imaging synchronization signal so that the timing of the imaging synchronization signal that occurs cyclically is at a same phase with respect to the control clock, wherein an adjustment amount for the adjusting of the phase is determined based on a difference between an interval of the imaging synchronization signal and an interval of a readout of one line wire by the readout unit.

* * * * *